United States Patent
Catchings et al.

(10) Patent No.: US 10,100,781 B1
(45) Date of Patent: Oct. 16, 2018

(54) GASEOUS FUEL DELIVERY SYSTEM

(76) Inventors: Alexander Roy Catchings, Toledo, OH (US); Corey Robert Brinkman, Toledo, OH (US)

(*) Notice: Subject to any disclaimer, the term of this patent is extended or adjusted under 35 U.S.C. 154(b) by 196 days.

(21) Appl. No.: 13/447,887

(22) Filed: Apr. 16, 2012

Related U.S. Application Data

(60) Provisional application No. 61/475,960, filed on Apr. 15, 2011.

(51) Int. Cl.
*F02B 43/00* (2006.01)
*F02M 21/02* (2006.01)
*F02M 21/04* (2006.01)

(52) U.S. Cl.
CPC ............ *F02M 21/02* (2013.01); *F02B 43/00* (2013.01); *F02M 21/04* (2013.01)

(58) Field of Classification Search
CPC .......... F02M 21/02; F02M 21/04; F02B 43/00
USPC .............. 123/527, 529, 575, 27 GE; 261/16; 76/82.1; 37/243
See application file for complete search history.

(56) References Cited

U.S. PATENT DOCUMENTS

| | | | | |
|---|---|---|---|---|
| 3,882,838 A | * | 5/1975 | Nutten | F02M 7/133 123/198 D |
| 4,335,697 A | * | 6/1982 | McLean | F02M 13/08 123/525 |
| 4,492,207 A | | 1/1985 | Hallberg | |
| 4,505,249 A | | 3/1985 | Young | |
| 5,655,505 A | * | 8/1997 | Tusino | F02M 17/22 123/516 |
| 5,775,309 A | | 7/1998 | Burrahm | |
| 6,016,832 A | * | 1/2000 | Vars | F02M 21/023 123/25 A |
| 6,068,017 A | | 5/2000 | Haworth et al. | |
| 6,276,345 B1 | * | 8/2001 | Nelson | F02M 13/08 123/525 |
| 6,568,375 B2 | * | 5/2003 | Ishikawa | F02B 43/00 123/527 |
| 2003/0106538 A1 | * | 6/2003 | Benson | F02B 43/00 123/527 |
| 2006/0021604 A1 | * | 2/2006 | Kaiser | F02M 21/0212 123/526 |

OTHER PUBLICATIONS http://www.aircooledpropane.com/mower/rev3.htm.*

(Continued)

*Primary Examiner* — Lindsay Low
*Assistant Examiner* — Omar Morales
(74) *Attorney, Agent, or Firm* — MacMillan, Sobanski & Todd, LLC

(57) ABSTRACT

A gaseous fuel delivery system includes a regulator valve having an inlet adapted to be connected with a high pressure source of a gaseous fuel such that the regulator valve lowers the pressure of the gaseous fuel from the high pressure source. A control valve has an inlet connected to the outlet of the regulator valve, and wherein the control valve is operable to control the flow of fluid between the inlet and outlet of the control valve. A cut off valve has an inlet connected to the outlet of the control valve, and wherein the cut off valve is operable between a first state, wherein flow of fuel is permitted to flow between the inlet and an outlet of the cut off valve, and a second state, wherein the flow of fuel is prevented from flowing between the inlet and the outlet of the cut off valve.

19 Claims, 4 Drawing Sheets

(56) References Cited

OTHER PUBLICATIONS

Air Cooled Propane (http://www.aircooledpropane.com/mower/rev3.htm).*
Air Cooled Propane: <http://www.aircooledpropane.com/mower/rev3.htm> May 12, 2010.*

* cited by examiner

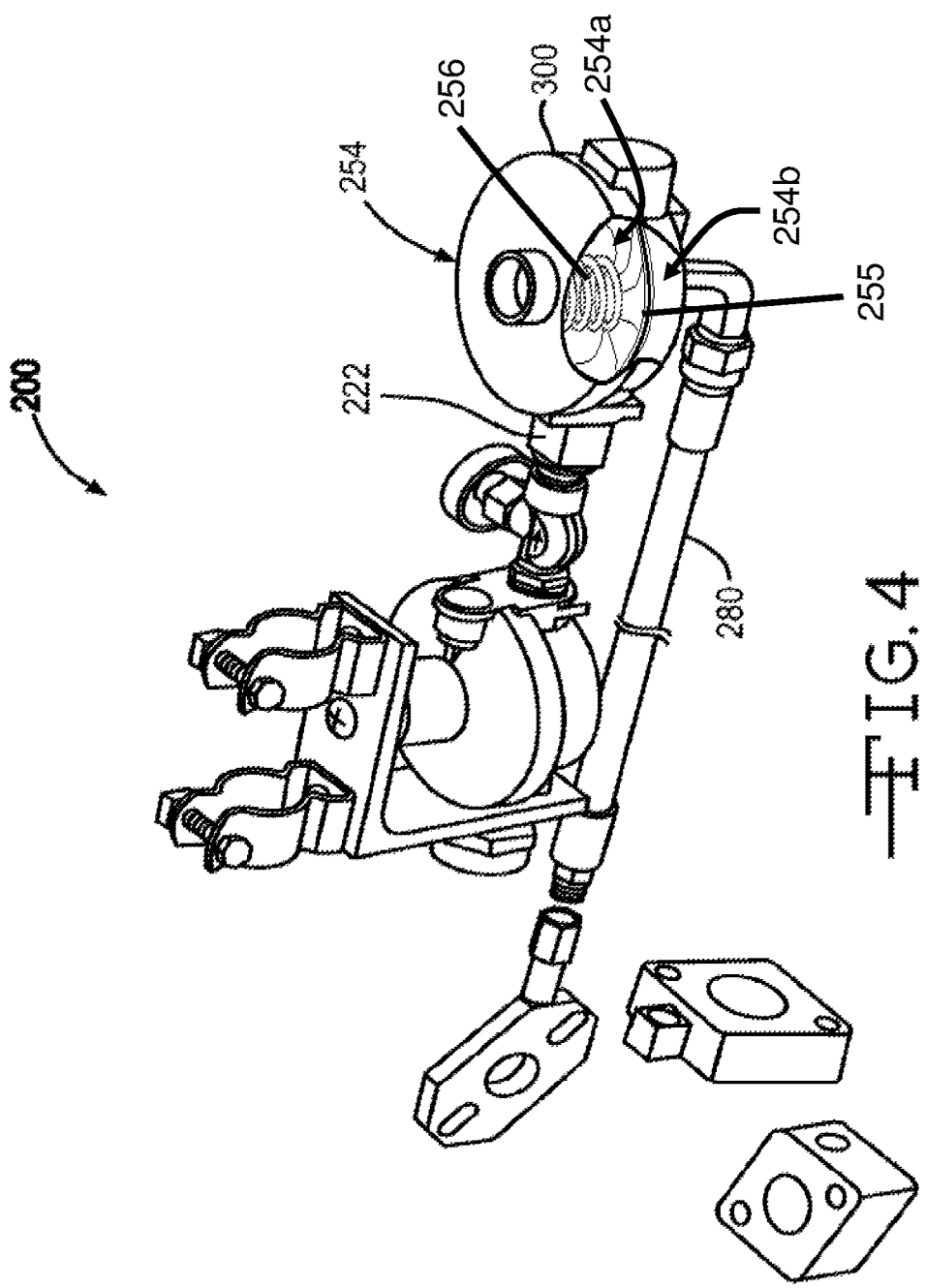

GASEOUS FUEL DELIVERY SYSTEM

CROSS-REFERENCE TO RELATED APPLICATIONS

This application claims the benefit of U.S. Provisional Application No. 61/475,960, filed Apr. 15, 2011, the disclosure of which is incorporated herein by reference.

BACKGROUND OF THE INVENTION

This invention relates in general to gaseous fuel systems for engines. Engines are used in a variety of vehicles and equipment. Most commercially available engines use either liquid or gaseous fuel as their fuel source. For example, it is well known to use gasoline or diesel as a fuel source for engines in various vehicles and equipment such as lawn mowers, compressors, generators, blowers, etc. It is also known to use gaseous fuels, such as propane, liquefied petroleum gas, natural gas, and hydrogen as fuel sources for engines. Some engines are also configured as dual fuel engines, wherein either or liquid fuel or a gaseous fuel can be used as the fuel source to a single engine. There also kits commercially available for converting an engine that was originally designed and manufactured for using gasoline or diesel as fuel sources to using gaseous fuels instead. Some advantages of using gaseous fuels, such as propane, instead of liquid fuels, such as gasoline or diesel, include lower fuel costs per operating hour, higher octane ratings, increased engine life and lower maintenance cost due to the gaseous fuel burning cleaner compared to some liquid fuels. Additionally, propane reduces hydrocarbon emissions and has less environmental impact compared to gasoline and diesel engines.

Engines using gaseous fuels include a fuel delivery system. These systems can be built integrally with the engines or can be installed in a kit-type of configuration used to convert an engine originally designed for using gasoline or diesel as fuel sources to using gaseous fuels instead. Conventionally known gaseous fuel delivery systems commonly include a regulator valve for reducing the generally high pressure level and flow rate from a source of gaseous fuel (tank) to a lower pressure and/or flow rate for proper fuel intake in the corresponding engine. A fuel control valve is also provided in the gaseous fuel delivery system to control the flow of propane between the tank and the engine. It is known to use valves that are manually operated or controlled by electronic, pneumatic, or hydraulic sources.

SUMMARY OF THE INVENTION

This invention relates to vehicle fuel systems and, in particular, a gaseous fuel delivery system including a regulator valve, a control valve and a cut off valve. The regulator valve has an inlet and an outlet, wherein the inlet is adapted to be connected with a high pressure source of a gaseous fuel such that the regulator valve lowers the pressure of the gaseous fuel from the high pressure source. The control valve has an inlet and an outlet, wherein the inlet is connected to the outlet of the regulator valve, and wherein the control valve is operable to control the flow of fluid between the inlet and outlet of the control valve. The cut off valve has an inlet and an outlet, wherein the inlet is connected to the outlet of the control valve, and wherein the cut off valve is operable between a first state, wherein flow of fuel is permitted to flow between the inlet and outlet of the cut off valve, and a second state, wherein the flow of fuel is prevented from flowing between the inlet and the outlet of the cut off valve.

Various aspects of this invention will become apparent to those skilled in the art from the following detailed description of the preferred embodiments, when read in light of the accompanying drawings.

BRIEF DESCRIPTION OF THE DRAWINGS

FIG. 4 is a perspective view of a third embodiment of a gaseous fuel delivery system.

DETAILED DESCRIPTION OF THE PREFERRED EMBODIMENTS

Figure 1:
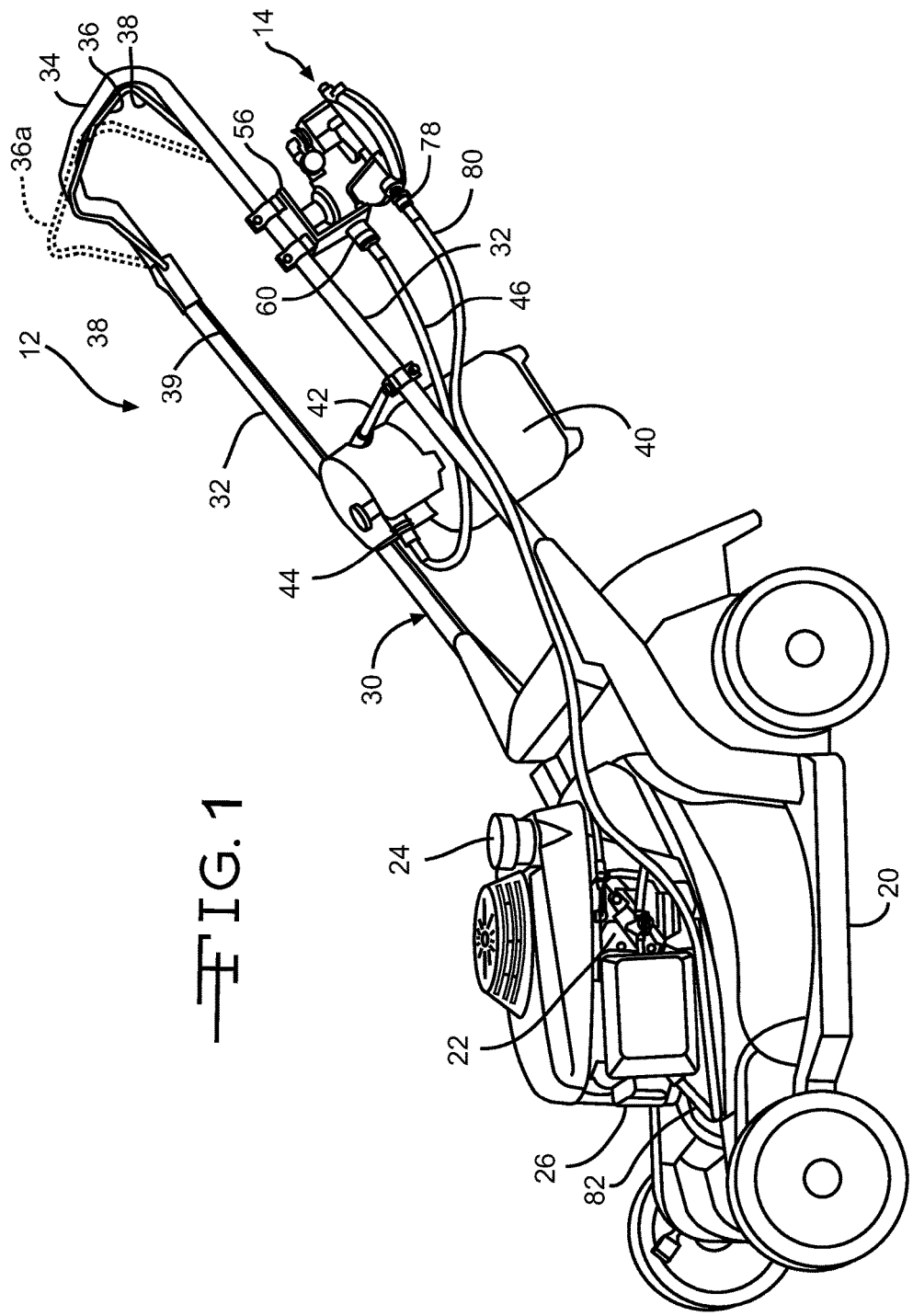
FIG. 1 is a perspective view of lawnmower including a gaseous fuel delivery system mounted thereon.

Referring now to the drawings, there is illustrated in FIG. 1 a conventional gasoline powered lawnmower, indicated generally at 12. The lawnmower 12 includes an engine 22 which was originally configured for using gasoline as its fuel source. An alternate gaseous fuel delivery system, indicated generally at 14, is mounted on the lawnmower 12 and is used to provide a gaseous fuel instead of gasoline. It should be understood that the lawnmower 12 and its corresponding engine 22 are shown and described herein only as an example of a suitable engine powered component that can be used with the gaseous fuel delivery system 14 of the present invention. The system 14 could also be used with and configured for engines in land vehicles, recreational vehicles, boats, tractors, and construction vehicles and equipment. Alternatively, the gaseous fuel delivery system 14 could also be used and configured for engines in lawn mowers, trimmers, snow throwers, compressors, generators, blowers, and pumps. It should also be understood that alternate fuels other than propane (gaseous or liquid) can be used, such as for example, liquefied petroleum gas, natural gas, hydrogen, and hydrogen-natural gas blends. For simplicity, the use of the fuel delivery system 14 will be shown and described as working in conjunction with the lawnmower 12. Although the gaseous fuel delivery system 14 is well suited for use in smaller engines, it should be understood that it can be used with a variety of engines.

Figure 2:
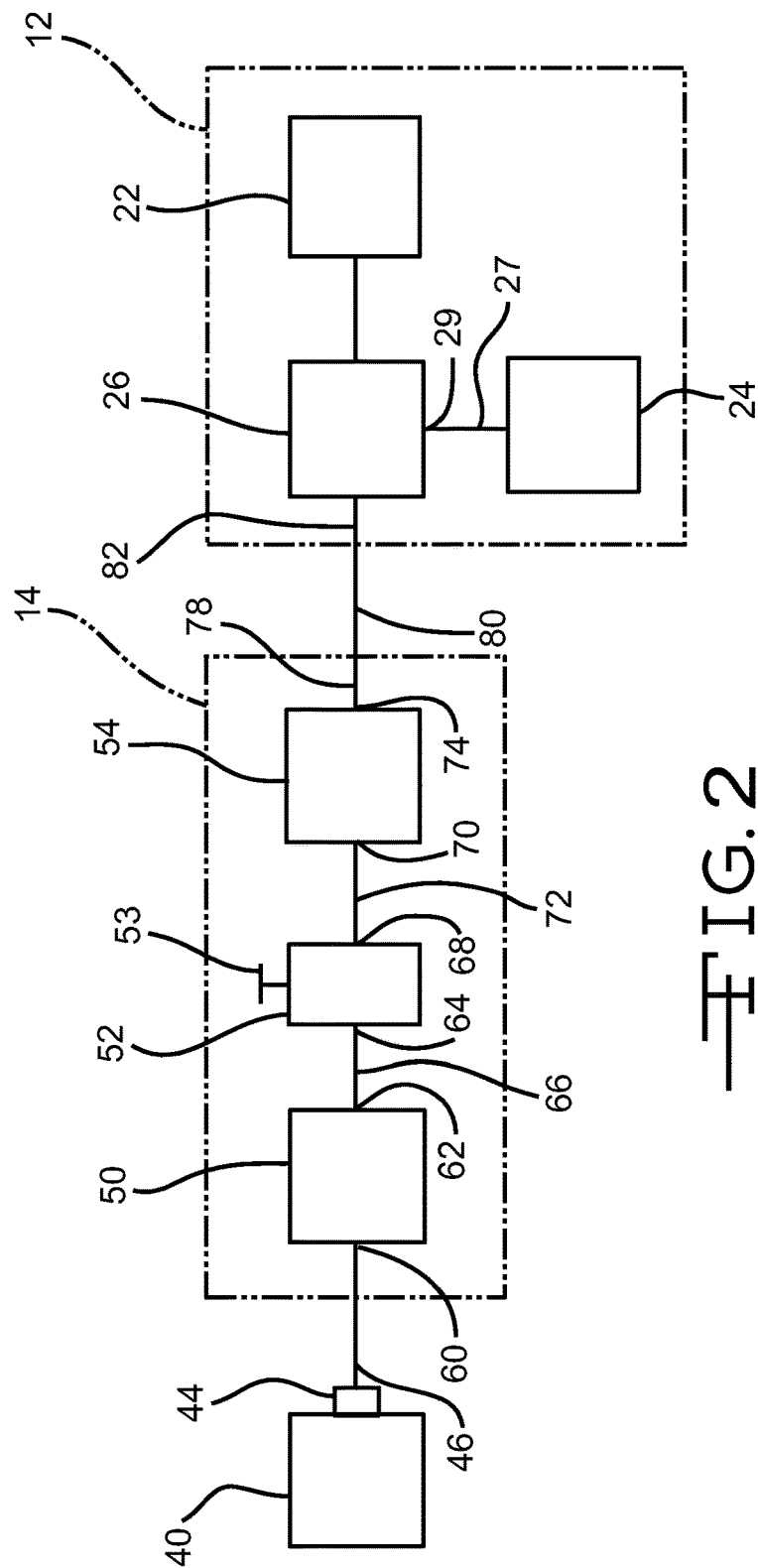
FIG. 2 is a schematic representation of the lawnmower and gaseous fuel delivery system of FIG. 1.

Referring to FIGS. 1 and 2, the lawnmower 12 includes a deck 20 housing a rotating blade (not shown) underneath. The internal combustion engine 22 is mounted on the deck 20. In the illustrated embodiment, the engine 22 is originally designed to use gasoline as a fuel source. The engine 22 is connected with a gasoline fuel tank 24 via a conventional carburetor 26. The function of the carburetor 26 is to generally mix air with a fine spray of gasoline or vaporized fuel and supply this mixture to the internal combustion engine 22. As schematically shown in FIG. 2, the gasoline tank 24 supplies a source of gasoline to the carburetor 26 via a fuel line 27 and fuel barb or port 29 of the carburetor 26. The tank 24 is mounted on the deck 20, the engine 22, and/or the carburetor 26.

The lawnmower 14 further includes a handle assembly, indicated generally at 30. The handle assembly 30 includes a pair of legs 32 that are attached to the deck 20. A cross member or control handle 34 attaches to upper portions of the legs 32 and is held by the user or operator of the lawnmower 12. The lawnmower 12 further includes a pivoting bail 36 located near the control handle 34. The bail 36 is in the form of a bent rod having a pair of legs 38 that are pivotally attached to the legs 32 of the handle assembly 30. The bail 36 is movable between an engaged position, such as illustrated by the solid lines in FIG. 1, and a disengaged position, as indicated by broken lines 36a in FIG. 1. The operator manually pivots the bail 36 between the engaged and disengaged positions. The bail 36 is connected with a clutch mechanism (not shown) via a Bowden cable 39 which engages and disengages the blade of the lawnmower 12. In the engaged position, the bail 36 is adjacent the control handle 34 and causes the clutch mechanism to permit rotation of the blade. In the disengaged position 36a, the bail 36 is spaced from the control handle 34 and causes the clutch mechanism to prevent rotation of the blade.

As stated above, a gaseous fuel delivery system 14 may be provided to convert the conventional internal combustion engine 22 of the lawnmower 12 into an engine using gaseous fuel instead of gasoline. A tank or cylinder 40 is provided to hold a supply of gaseous fuel. In the illustrated embodiment, the cylinder 40 holds a supply of propane in liquid form as the source of gaseous fuel. The cylinder 40 may be mounted on the lawnmower 12 by any suitable manner. In the illustrated embodiment, the cylinder 40 is mounted on the handle assembly 30 by a mounting bracket 42. Of course, the cylinder 40 can be any suitable container and dispenser for holding a source of gaseous fuel. The cylinder 40 includes an on/off supply valve 44 connected to a conduit or attachment line 46.

The gaseous fuel delivery system 14 generally includes a regulator valve 50, a fuel control valve 52, and a secondary regulator or cut off valve 54. The valves 50, 52, and 54 may be connected together and/or to a mounting bracket 56 to form an assembly. The mounting bracket 56 may be attached to an upper portion of the handle assembly 30 so that the gaseous fuel delivery system 14 is within reach of the operator of the lawnmower 12. The regulator valve 50 includes an inlet port 60 connected to the attachment line 46 for receiving propane from the cylinder 40. An outlet port 62 of the regulator valve 54 is connected with an inlet port 64 of the fuel control valve 52. The ports 62 and 64 may be directly connected together or may be connected via a separate line 66. The outlet port 68 of the fuel control valve 52 is connected to an inlet port 70 of the cut off valve 54. The ports 68 and 70 may be directly connected together or may be connected via a separate line 72. An outlet port 74 is connected with a first end 78 of a fuel supply line 80. A second end 82 of the fuel supply line 80 is connected to the engine 22 and/or the carburetor 26 of the lawnmower 12.

The second end 82 of the fuel supply line 80 can be connected at any suitable location within the engine 22 and/or carburetor 26. As stated above, the fuel delivery system 14 is used in place of the gasoline fuel delivery system which connected the gasoline tank 24 to the carburetor 26. Although the gasoline and air mixing function of the carburetor 26 is no longer needed when using the gaseous fuel delivery system 14, the carburetor 26 provides a convenient place to introduce the gaseous fuel. One example of a suitable gaseous fuel hook up would be to remove the fuel barb or end of the fuel line 27 from the port 29 of the carburetor 26 and instead attach the second end 82 of the gaseous fuel supply line 80 to the port 29 of the carburetor 26. If desired, the connections can be reversed and the lawnmower 12 can be reconfigured back to a gasoline fueled system. Another suitable gaseous fuel hook up for lawnmowers that do not have easily accessible ports 29 would be to drill a hole into the body of the carburetor 26 or the block of the engine 22 and attach the second end 82 of the gaseous fuel supply line 80 to a proper fitting mounted in the drilled hole. Yet another suitable gaseous fuel hook up would be to use a spacer plate (similar to spacers 150, 152, 154 shown in FIG. 3) between the carburetor 26 and the engine head. In some lawnmower engines, an existing spacer plate may be present, such as for overhead cam engines and overhead valve engines. A replacement spacer plate can be substituted which includes a port for connection with the gaseous fuel supply line 80 which would then provide a pathway for the gaseous fuel into the engine 22. For example, the spacer may be in the form of a block or plate having first and second major sealing surfaces having a central opening formed therethrough. The replacement spacer includes a fuel line tap and conduit (formed through the spacer) which is connected to the fuel supply line 80 and communicates with the central opening formed in the middle of the spacer to provide communication between the end 82 of the fuel supply line 80 and the intake of the engine 22. For these methods described above, the carburetor 26 simply functions as a conduit or path to the cylinders of the engine 22.

The regulator valve 50 may be any suitable valve arrangement which reduces the generally high pressure level and flow rate from the cylinder 40 to a lower, safer pressure for proper fuel intake in the engine 22. The high-pressure propane that exits the cylinder 40 via the attachment line 46 is reduced by the regulator valve 50. The reduced pressure propane exits the regulator valve 50 via the port 62 and introduced into the line 66 to the fuel control valve 52. For example, the pressure within the cylinder 40 may be as high as about between 150-350 p.s.i. which is reduced to about between 1 to 10 p.s.i. through the regulator valve 50. One suitable valve arrangement for the regulator valve 50 is a diaphragm type regulator valve assembly. A rubber diaphragm is attached within a circular or saucer shaped housing. A spring member and sealing member are connected to the diaphragm. The spring member and the diaphragm exert a back pressure. The back pressure retards the flow of the high pressure propane through the sealing member and outlets the relatively low pressure propane through the port 62 into the line 66. Generally, the stronger the spring member, the lower the gas pressure at the port 62.

The fuel control valve 52 further controls the flow rate of propane between the regulator valve 50 and the engine 22. The fuel control valve 52 can be any suitable valve arrangement for adjusting the pressure and/or flow rate of the propane flowing from the regulator valve 50 to the engine 22. For example, the fuel control valve 52 may be a needle valve which is manually operated to control the pressure and/or flow rate of the propane. A needle valve includes a housing having an inlet at the port 64 and an outlet at the port 68. A valve member is attached or integrally formed onto a threaded control arm having a knob, indicated schematically at 53 in FIG. 2. The threaded control arm is threadably fastened to and disposed in the housing. The valve member can be moved towards or away from a valve seat within the housing by turning the knob 53, thereby opening or restricting the flow path through the needle valve housing. During use, the operator can adjust the fuel control valve 52 as required to provide a proper flow of propane to the engine. The speed of the engine 22 can be adjusted by turning the knob 53 of the fuel control valve 52. Of course, the fuel control valve 52 may be any other type of valve or can be controlled by means other than manual rotation of a knob, such as being electronically, pneumatically, or hydraulically controlled.

The fuel delivery system 14 also includes the cut off valve 54 positioned between the fuel control valve 52 and the engine 22. The cut off valve 54 can by any suitable valve that prevents the flow of propane from the cylinder 40 to the engine 22 under desired circumstances. The cut off valve 54 may incorporate a pressure and/or flow rate regulator function or could simply be an on/off valve having either an open position or a closed position. For example, it may be desirable to prevent the flow of propane through the fuel delivery system 14 when the lawnmower's engine 22 is not running. For this situation, the cut off valve 54 could include a sensor or otherwise communicate with the engine 22 to determine if the engine 22 was running and if not, then shut of the propane flow into the fuel supply line 80. This could also be accomplished by using a propane demand regulator valve which senses a vacuum caused by the running engine 22 which then permits the flow of propane through the cut-off valve 54. If a vacuum is not detected, such as when the engine 22 is not running, the cut-off valve 54 prevents the flow of propane through the cut-off valve 54. One such suitable example of a propane demand regulator valve includes a diaphragm mounted within a circular or saucer shaped housing. The housing includes an inlet connected to the line 72 and an outlet connected to the fuel supply line 80. A valve seat is located between the inlet and outlet. A spring member biases a sealing member against a seat when no vacuum is present, thereby preventing the flow of propane through the valve 54. When a vacuum is detected at the outlet due to the running engine 22, the diaphragm is moved to a position to unseat the valve member from the seat, thereby permitting flow from the inlet to the outlet. Thus, as long as a vacuum (or pressure lower than atmospheric pressure) exists within the fuel supply line 80 due to the engine 22 pulling a vacuum, propane will flow through the cut off valve 54.

Another example of a circumstance when it may be desirable to prevent flow through the cut off valve 54 is when an operator of the lawnmower is not present. Thus, the operator is unable to walk away from a running lawnmower. This could be determined by requiring the operator to actuate a device which triggers the cut-off valve 54 to engage to an open position. For example, the cut off valve 54 could be a manually operated squeeze valve or a lever operated valve which simply operates the cut off valve 54 between open and closed positions. The cut off valve 54 could be configured so that it is biased to its closed position such that when the operator is not manually actuating the cut off valve 54, flow of propane through the fuel delivery system 14 is prevented. In this situation, the operator needs to present to actuate the cut off valve 54 to maintain the flow of propane to the engine.

For operation of the lawnmower 12 with the gaseous fuel delivery system 14, the supply of gasoline to the engine is first cut off or disconnected from the engine 22. The supply of propane (or other gaseous fuel) is then provided by any suitable method such as those described above. The on/off supply valve 44 of the tank 40 can be turned to the on position thereby permitting the flow of propane from the tank 40. The knob 53 of the fuel control valve 52 can then be turned to permit the flow of propane through the fuel control valve 52. If desired, the knob can be turned to its on position by several seconds to purge the lines 72 and 80 of air. Note that depending on the type of cut off valve 54 used, the cut off valve 54 may need to be opened. For example, it may be needed to move the bail 36 to its engaged position if the cut off valve 54 is connected to the bail 36. After purging, the knob 53 of the fuel control valve 52 can be turned to permit a restricted flow of propane therethrough, such as for example at ¼ of a full amount. The engine 22 of the lawnmower 14 is then started, such as for example, pulling the starting cord or engaging an electric starter. When the engine 22 starts to engage (kick over), the knob 53 can be turned to increase or decrease the flow of propane to maintain a desired engine speed.

Figure 3:
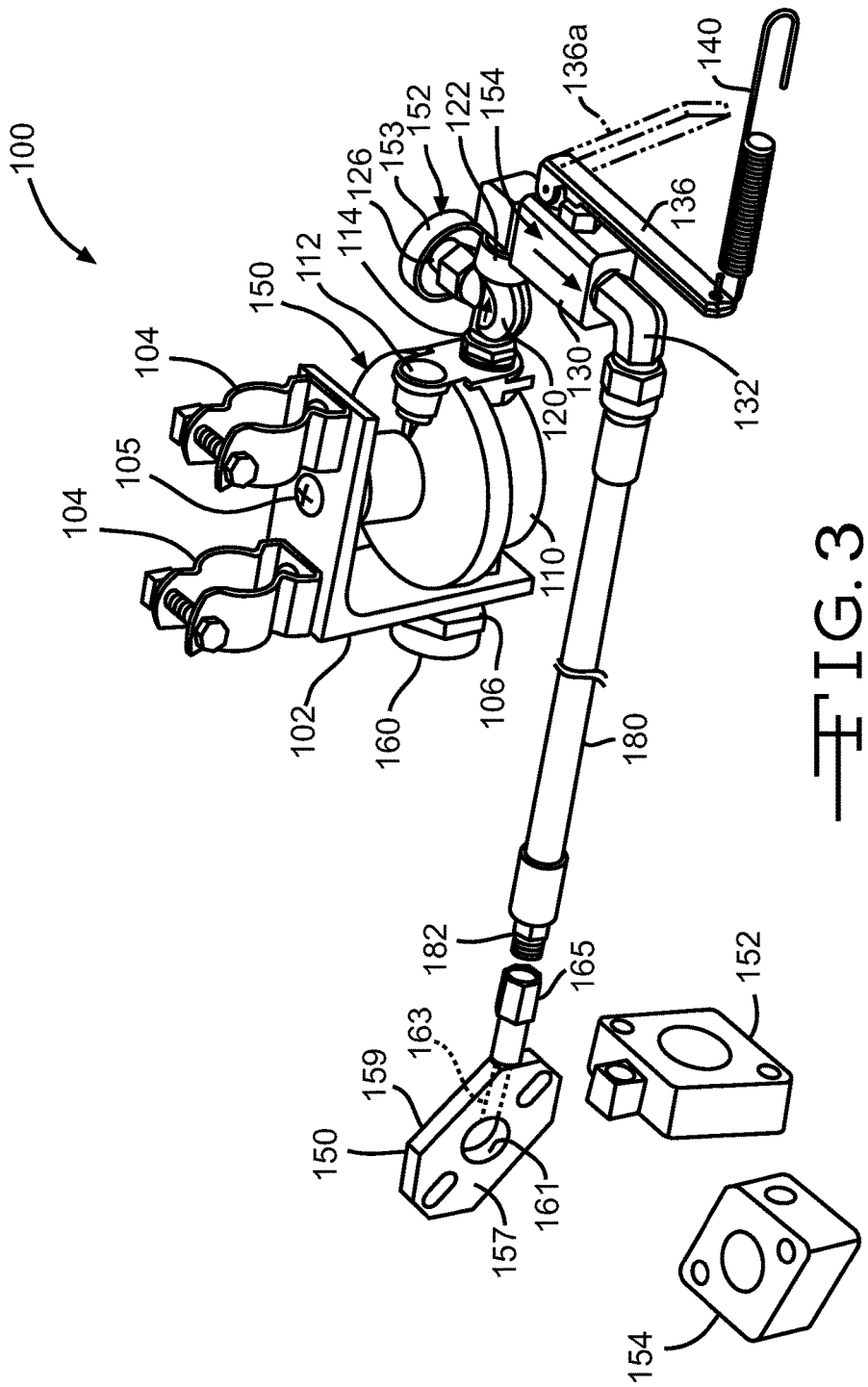
FIG. 3 is a perspective view of a second embodiment of a gaseous fuel delivery system.

There is illustrated in FIG. 3, a second embodiment of a gaseous fuel system, indicated generally at 100. As with the gaseous fuel system 14 described above, the gaseous fuel system 100 may use a supply of propane (not shown) or other gaseous fuel and may be used with any suitable engine, such as the lawnmower engine 22 described above. The system 100 includes an L-shaped mounting bracket 102 having a plurality of clamps or clips 104 for mounting the system 100, such as on the handle assembly 30 of the lawnmower 14 shown in FIG. 1.

The gaseous fuel system 100 generally includes a regulator valve 150, a fuel control valve 152, and a cut off valve 154. The regulator valve 150, the fuel control valve 152, and the cut off valve 154 may be similar in function as the regulator valve 50, the fuel control valve 52, and the cut off valve 154 described above with respect to FIGS. 1 and 2. As shown in FIG. 3, the regulator valve 150 is attached to the mounting bracket 102 by a fastener 105 and an inlet fixture 106 having an inlet port 160. The inlet fixture 106 functions in the same manner as the inlet port 60 and is adapted to be connected with a supply of gaseous fuel (not shown), such as the cylinder 40. The regulator valve 150 is a diaphragm type regulator valve assembly. A rubber diaphragm (not shown) is attached within a saucer shaped housing 110 and separates the interior of the housing into upper and lower chambers (not shown). The upper chamber is vented to atmosphere at a vent 112. A spring member (not shown) and sealing member (not shown) are located in the lower chamber and are connected to the diaphragm. The spring member and the diaphragm exert a back pressure. The back pressure retards the flow of the high pressure propane through the sealing member and outlets the relatively low pressure propane through a threaded connector 114.

The connector 114 functions as the outlet port of the regulator valve 150 and the inlet port of the fuel control valve 152. The fuel control valve 152 may be a needle type valve which is manually operated to control the pressure and/or flow rate of the propane. A fuel control valve 152 includes a housing 120 having an inlet defined by the threaded connector 114. An outlet port of the fuel control valve 152 communicates with a threaded connector 122 which is attached to the cut off valve 154. The fuel control valve 152 includes a valve member (not shown) attached or integrally formed onto a threaded control arm 126 having a knob 153. The threaded control arm 126 is threadably fastened to and disposed in the housing 120. The valve member can be moved towards or away from a valve seat within the housing 120 by turning the knob 153 of the control arm 126, thereby opening or restricting the flow path through the fuel control valve 152. During use, the operator can adjust the fuel control valve 152 as required to provide a proper flow of propane to the engine.

In the embodiment illustrated in FIG. 3, the cut off valve 154 is a manually operated on/off lever valve which can be adapted to be connected with the bail 36 of the lawnmower 12. The cut off valve 154 includes a housing 130 having an inlet connected to the connector 122 from the fuel control valve 152. A connector 132 is mounted on the housing 130 and defines an outlet of the cut off valve 154. A lever arm 136 is pivotally attached to the housing 130 and is movable between a disengaged position, as shown in solid lines in FIG. 3, and an engaged position, as indicated by phantom lines 136a in FIG. 3, in which the lever arm 136 is pivoted to a position away from the housing 130. The lever arm 136 may be connected to the bail 36 by a cable or an optional spring 140 connected to the end of the lever arm 136. When the bail 36 is in its disengaged position 36a, as shown in FIG. 1, the lever arm 136 is also in its disengaged position, thereby preventing the flow of fuel through the cut off valve 154. When the operator moves the bail 36 to its engaged position 36a, the spring 140 is pulled causing the lever arm 136 to move to its engaged position, thereby permitting the flow of fuel through the cut off valve 154. The inner workings of the cut off valve 154 can be any suitable valve arrangement, such as a needle type valve, sleeve valve, or ball valve which function as an on/off type valve. Alternatively, the cut off valve 154 could be configured as a multiple stepped valve arrangement such that the cut off valve 154 has intermediate flow positions and not just a simple off and on position.

The connector 132 is connected to a fuel supply line 180 which can be any suitable conduit, hose or line for providing communication between the cut off valve 154 and an end connector 182. The fuel supply line 180 can be rigid or flexible. Similar to the second end 82 of the fuel supply line 80, the end connector 182 can be adapted to be connected to the engine 22 and/or carburetor 26 by any suitable manner. There is illustrated in FIG. 3, three embodiments of spacer plates 150, 152, and 154 which can be connected to the end connector 182 and then to the engine 22 and/or carburetor 26. Although the spacer plates 150, 152, and 154 generally perform the same function, they include different dimensional configurations for installing into different engine and carburetor configurations. For simplicity, only the spacer plate 150 will be described but it should be understood that the spacer plates 152 and 154, or other suitable spacer plates (not shown) could be configured in a similar manner. The spacer plate 150 has first and second major surfaces 157 and 159 for sealing against the engine and carburetor. A central opening 161 is formed therethrough which provides a pathway between the engine and carburetor. A passageway 163 communicates with the central opening 161 and a connector 165. The connector 165 is adapted to be connected to the end connector 148.

There is illustrated in FIG. 4, a third embodiment of a gaseous fuel system, indicated generally at 200. As with the gaseous fuel systems 14 and 100 described above, the gaseous fuel system 200 may use a supply of propane (not shown) or other gaseous fuel and may be used with any suitable engine, such as the lawnmower engine 22 described above. The system 200 is similar to the system 100 and includes many of the same components. Therefore, the system 200 will not be described in detail. One of the differences between the systems 100 and 200 is that the system 200 includes a cut off valve 254 different from the cut off valve 154. The cut off valve 254 may be a propane demand regulator valve which senses a vacuum caused by the running engine 22 which then permits the flow of propane through the cut-off valve 254. If a vacuum is not detected, such as when the engine 22 is not running, the cut-off valve 254 prevents the flow of propane through the cut-off valve 254. The cut off valve 254 includes a saucer shaped housing 300 having a diaphragm 255 mounted therein which separates the interior of the housing into and upper and lower chambers 254a and 254b, respectively. The housing 300 includes an inlet connected to a connector 222 and an outlet connected to a fuel supply line 280. The cut off valve 254 includes a valve seat (not shown) located between the inlet and outlet. A spring member 256 biases a sealing member of the diaphragm against the valve seat when no vacuum is present, thereby preventing the flow of propane through the cut off valve 254. When a vacuum is detected at the outlet due to the running engine 22, the diaphragm 255 is moved to a position to unseat the valve member from the seat, thereby permitting flow from the inlet to the outlet. Thus, as long as a vacuum (or pressure lower than atmospheric pressure) exists within the fuel supply line 280 due to the engine 22 pulling a vacuum, propane will flow through the cut off valve 254.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A gaseous fuel delivery system for an engine having a carburetor comprising:
    a regulator valve having an inlet and an outlet, wherein the inlet is adapted to be connected with a high pressure source of a gaseous fuel such that the regulator valve lowers the pressure of the gaseous fuel from the high pressure source such that the outlet provides a flow of the gaseous fuel at a generally constant lowered pressure;
    a control valve having an inlet and an outlet, wherein the inlet is connected to the outlet of the regulator valve, and wherein the control valve is operable to control the flow of fluid between the inlet and outlet of the control valve such that the flow of gaseous fuel from the control valve output is supplied in a generally constant volume and the generally constant pressure;
    a cut off valve having an inlet and an outlet, wherein the inlet is connected to the outlet of the control valve, and wherein the cut off valve is operable between a first state, wherein flow of fuel is permitted to flow between the inlet and outlet of the cut off valve, and a second state, wherein the flow of fuel is prevented from flowing between the inlet and the outlet of the cut off valve, the cut off valve being a diaphragm valve that is actuated to the first state by an engine vacuum pressure level at the cut off valve outlet such that an engine speed and the resultant vacuum pressure level at the cut off valve outlet regulates operation of the diaphragm valve to meter the generally constant pressure and volume flow of gaseous fuel to the engine.

2. The system of claim 1, wherein a spacer provides fluid communication between an engine and a carburetor and further includes a port configured to supply the generally constant pressure and volume fuel to the engine and communicate the engine vacuum pressure level to the cut off valve.

3. The system of claim 2, wherein the regulator output is directly connected to the control valve input and the control valve output is directly connected to the cut off valve input, the cut off valve being remotely connected to the spacer.

4. The system of claim 3, wherein a fuel line provides fluid communication between the cut off valve and the spacer such that both the vacuum pressure level and the constant pressure and volume flow of gaseous fuel are communicated through the fuel line.

5. The system of claim 4, further including a valve mounting bracket supporting the regulator valve, the control valve, and the cut off valve, wherein the valve mounting bracket is adapted to be attached to a handle of a lawnmower.

6. The system of claim 5, further including a tank for holding the high pressure source of gaseous fuel, wherein the tank is connected to the inlet of regulator valve via a conduit.

7. The system of claim 1, wherein the control valve is a manually operated valve.

8. The system of claim 7, wherein the control valve is a needle valve.

9. A gaseous fuel delivery system for an internal combustion engine, the system comprising:
a source of gaseous fuel pressurized to a first pressure level and configured to provide a fuel flow having a second pressure level that is lower than the first pressure level, the fuel flow further being controllable for volumetric flow;
a cut off valve connected between the source of gaseous fuel and an internal combustion engine, wherein the cut off includes a diaphragm that is actuated proportionally by vacuum pressure levels generated from operating speeds of the internal combustion engine such that the gaseous fuel is permitted to flow when the diaphragm is actuated by the vacuum present at the cut off valve and the gaseous fuel is prevented from flowing when the vacuum level at the cut off valve ceases in response to the internal combustion engine ceasing to run; and
a spacer mounted between the internal combustion engine and a carburetor, the spacer having an opening that provides fluid communication between the carburetor and the internal combustion engine, the spacer further including a passageway that is in fluid communication with the opening, the passageway communicating vacuum from the internal combustion engine to the cut off valve and further providing gaseous fuel flow to the internal combustion engine.

10. The system of claim 9, wherein a regulator valve has an inlet connected to the source of a gaseous fuel and an outlet, the regulator valve configured to lower the pressure of the gaseous fuel from the first pressure level to the second pressure level and a control valve having an inlet and an outlet, wherein the inlet is connected to the outlet of the regulator valve and the outlet is connected to the cut off valve, and wherein the control valve controls the volumetric flow of gaseous fuel to the cut off valve.

11. The system of claim 10, wherein the regulator output is directly connected to the control valve input and the control valve output is directly connected to the cut off valve input and a valve mounting bracket supports the regulator valve, the control valve, and the cut off valve.

12. The system of claim 11, wherein a flexible fuel line connects the outlet of the cut off valve to the spacer such that the engine vacuum pressure level and the gaseous fuel flow are both communicated through the flexible fuel line.

13. The system of claim 12, wherein the regulator is a diaphragm valve and the control valve is a needle valve.

14. A gaseous fuel delivery system comprising:
a regulator valve having an inlet adapted to be connected with a high pressure source of a gaseous fuel and an outlet, wherein the regulator valve lowers the pressure of the gaseous fuel from the high pressure source to the outlet;
a control valve having an inlet connected to the outlet of the regulator valve and an outlet, wherein the control valve is operable to control the volumetric flow of gaseous fuel from the regulator;
a cut off valve having an inlet connected to the outlet of the control valve and an outlet, wherein the cut off valve includes a diaphragm that is actuated by vacuum pressure levels at the cut off valve outlet proportional to the operating speed of an internal combustion engine such that the gaseous fuel is permitted to flow when the vacuum pressure levels are present at the cut off valve and the gaseous fuel is prevented from flowing when the vacuum pressure levels cease to be present at the cut off valve; and
a spacer having a first surface configured to connect with a portion of the internal combustion engine and a second surface configured to connect with a portion of a carburetor, wherein the spacer further includes an opening between the first and second surfaces to provide fluid communication between the engine and the carburetor, and wherein the spacer further includes a passageway formed through the spacer that is in fluid communication with the opening, the passageway communicating the vacuum pressure level to the cut off valve and also providing gaseous fuel flow to the internal combustion engine.

15. The system of claim 14, wherein the regulator valve output is directly connected to the control valve input and the control valve output is directly connected to the cut off valve input and a valve mounting bracket supports the regulator valve, the control valve, and the cut off valve.

16. The system of claim 15, wherein the cut off valve is remotely connected to the passageway by a flexible fuel supply line.

17. The system of claim 16, wherein the high pressure source of gaseous fuel is a tank of pressurized propane that is connected by a fuel line to the regulator valve inlet.

18. The system of claim 17, wherein the regulator valve is a diaphragm valve and the control valve is a needle valve.

19. The system of claim 18, wherein the tank of pressurized propane and the valve mounting bracket are connected to a handle of a lawnmower.

* * * * *